(12) United States Patent
Nordin

(10) Patent No.: US 12,103,161 B2
(45) Date of Patent: Oct. 1, 2024

(54) REMOTE-CONTROLLED DEMOLITION ROBOT WITH IMPROVED FIELD OF APPLICATION AND A METHOD TO ACHIEVE SUCH A DEMOLITION ROBOT

(71) Applicant: BROKK AKTIEBOLAG, Skellefteå (SE)

(72) Inventor: Tobias Nordin, Skellefteå (SE)

(73) Assignee: BROKK AKTIEBOLAG, Skellefteå (SE)

( * ) Notice: Subject to any disclaimer, the term of this patent is extended or adjusted under 35 U.S.C. 154(b) by 354 days.

(21) Appl. No.: 17/309,640

(22) PCT Filed: Nov. 26, 2019

(86) PCT No.: PCT/SE2019/051200
§ 371 (c)(1),
(2) Date: Jun. 11, 2021

(87) PCT Pub. No.: WO2020/122789
PCT Pub. Date: Jun. 18, 2020

(65) Prior Publication Data
US 2022/0032472 A1    Feb. 3, 2022

(30) Foreign Application Priority Data
Dec. 14, 2018   (SE) .................... 1851590-8

(51) Int. Cl.
*B25J 19/02*   (2006.01)
*B25J 5/00*    (2006.01)
(Continued)

(52) U.S. Cl.
CPC ............... *B25J 13/06* (2013.01); *B25J 5/005* (2013.01); *B25J 19/023* (2013.01);
(Continued)

(58) Field of Classification Search
CPC . E02F 9/26; E02F 9/205; E02F 9/2004; E02F 3/966; B25J 19/023; B25J 13/06;
(Continued)

(56) References Cited

U.S. PATENT DOCUMENTS 8,224,512 B1 *   7/2012   Dengel ................. B63H 21/21
                                                            440/5
2011/0282519 A1   11/2011  Carlsson
(Continued)

FOREIGN PATENT DOCUMENTS

CN          1792569 A     6/2006
JP          H0665949 A    3/1994
(Continued)

OTHER PUBLICATIONS

Bai et al., Kinect-Based Hand Tracking for First-Person-Perspective Robotic Arm Teleoperation, 2019, IEEE, p. 684-691 (Year: 2019).*
(Continued)

*Primary Examiner* — McDieunel Marc
(74) *Attorney, Agent, or Firm* — Knobbe, Martens, Olson & Bear, LLP

(57) ABSTRACT

A remote-controlled demolition robot has improved field of application The demolition robot includes a chassis, a base with a rotatable top, a moveable arm, a working tool, a controller, and a remote-control intended to be impacted by an operator. The demolition robot is arranged to give commands that are registered by the controller for operation of the remote-controlled demolition robot. The demolition robot also includes a broadcaster and an image sensor, which can register first image data and second image data of a scene of surroundings of the demolition robot from at least two different view directions. The broadcaster can communicate with an image display, which is arranged to show, in real time, an image area of the scene to an operator, who can (Continued)

control and operate the demolition robot through indirect viewing.

15 Claims, 3 Drawing Sheets

(51) Int. Cl.
    *B25J 13/06* (2006.01)
    *E02F 9/20* (2006.01)
    *H04W 4/06* (2009.01)
    *E02F 3/96* (2006.01)
    *E04G 23/08* (2006.01)

(52) U.S. Cl.
    CPC ............ *E02F 9/2004* (2013.01); *E02F 9/205* (2013.01); *H04W 4/06* (2013.01); *E02F 3/966* (2013.01); *E04G 23/082* (2013.01)

(58) Field of Classification Search
    CPC .......... B25J 5/005; H04W 4/06; H04N 7/181; G06F 3/011; E04G 23/082
    See application file for complete search history.

(56) References Cited

U.S. PATENT DOCUMENTS

| | | | |
|---|---|---|---|
| 2015/0190925 | A1 | 7/2015 | Hoffman et al. |
| 2017/0322624 | A1 | 11/2017 | Niccolini et al. |
| 2018/0236666 | A1 | 8/2018 | Mozeika et al. |
| 2019/0066323 | A1* | 2/2019 | Li .......................... G06F 18/22 |
| 2021/0042907 | A1* | 2/2021 | Campomanes ........... G06T 7/50 |

FOREIGN PATENT DOCUMENTS

| | | |
|---|---|---|
| JP | 08107516 A | 4/1996 |
| JP | S63-68 B2 | 1/1998 |
| JP | 3000068 B2 | 1/2000 |
| JP | 2014215039 A | 11/2014 |
| KR | 20080059792 A | 7/2008 |
| KR | 20120033519 A | 4/2012 |
| WO | 2018063058 A1 | 4/2018 |
| WO | 2018077459 A1 | 5/2018 |
| WO | 2018168163 A1 | 9/2018 |

OTHER PUBLICATIONS

Saitoh et al., A 2D-3D integrated interface for mobile robot control using omnidirectional images and 3D geometric models, 2007, IEEE, 173-176 (Year: 2007).*
Zhang et al., Development of a New Remote Controlled Emergency-Handling and Fire-Fighting Robot, 2009, IEEE, p. 239-243 (Year: 2009).*
Ballantyne et al., A virtual environment display for teleoperated excavation, 1998, IEEE, p. 1894-1899 (Year: 1998).*
Le et al., Study on the Architecture of the Remote Control System for Hydraulic Excavator, 2011, IEEE, p. 1-7 (Year: 2011).*
Liu et al., Modelling and Remote Control and Excavator, 2010, IEEE, p. 1-10 (Year: 2010).*
Yang et al., Remote control system of industrial field robot, 2008, IEEE, p. 442-447 (Year: 2008).*
Yu et al., Review of modelling and remote control for excavators, 2010, Internet, p. 1-13 (Year: 2010).*
Nishiyama et al., Operation Analysis of Hydraulic Excavator with Different Operation System, 2016, Internet, p. 1-8 (Year: 2016).*
Salimov et al., Design and Manufacturing of a Virtual-Assisted Teleoperated Excavator Platform, 2020, Internet, p. 1-107 (Year: 2020).*
Singh et al., Task Planning for Robotic, 2002, Internet, p. 1284-1291 (Year: 2002).*
Decision of Rejection issued in the corresponding Chinese Patent Application No. 201980082029.X, dated Mar. 29, 2023 in 21 pages including English translation.
Chinese Office Action issued for Chinese Patent Application No. 201980082029.X, dated May 6, 2022 in 21 pages Including English translation.
International Search Report for International Application No. PCT/SE2019/051200, dated Feb. 28, 2020 in 4 pages.
The Second Chinese Office Action issued for Chinese Patent Application No. 201980082029.X, dated Oct. 10, 2022 in 22 pages including English translation.

* cited by examiner

REMOTE-CONTROLLED DEMOLITION ROBOT WITH IMPROVED FIELD OF APPLICATION AND A METHOD TO ACHIEVE SUCH A DEMOLITION ROBOT

CROSS-REFERENCE TO RELATED APPLICATIONS

This application is the U.S. National Phase under 35. U.S.C. § 371 of International Application PCT/SE2019/051200, filed Nov. 26, 2019, which claims priority to Swedish Patent Application No. 1851590-8, filed Dec. 14, 2018. The disclosures of the above-described applications are hereby incorporated by reference in their entirety.

FIELD OF THE INVENTION

The present invention relates to a remote-controlled demolition robot with improved field of application according to the pre-amble of claim 1. The invention also relates to a method to achieve a demolition robot with improved field of application.

BACKGROUND OF THE INVENTION

Remote-controlled mobile electrically powered wrecking and demolition robots, in the following called demolition robot, are used in wrecking and demolition of building constructions and other types of work tasks that can be dangerous or constitute a health hazard to humans. An operator walks beside the demolition robot and remote-controls it by means of an operation cabinet, which via a strap or the like is suspended on the operator's body.

Common demolition robots of the present type are marketed under the trademark BROKK®. The name refers to the small but strong dwarf, who according to the Nordic mythology forged the hammer of Thor, the god of thunder. Due to its small size with small construction dimensions and low weight, the demolition robot, unlike for instance an excavator, in which an operator sitting in a driver's cabin drives it from inside the machine, is suited to perform work in areas, where the work environment can be directly harmful to health, and in some cases so dangerous that an operator cannot be at a safe distance from neither the machine nor the relevant work area.

A demolition robot typically has a travelling base and on this a top that is rotatable in a horizontal plane with an operable arm means, which at a free end, can carry various types of exchangeable working tools. A demolition robot is normally supplied with current via a cable that the demolition robot drags or draws after it during driving. The cable is usually connected to a stationary electric network. The combination of network and battery power also occurs. In the following, the expression "robot" relates to an electro-chemical travelling machine, which can perform physical work tasks. In the following, the expression "mobile" relates to an electrochemical machine equipped with a drive assembly, by which it is travelling. In the following, the expression demolition robot relates to any remote-controlled working machine that is equipped with a moveable arm means.

A problem of prior art demolition robots is that they must be within visual range for an operator, by means of remote control, to be able to control and operate the demolition robot. However, there is a limit to the distance between the operator and the demolition robot and its work area to be able to use the demolition robot in the intended manner. This limit can depend on a number of various circumstances, such as the type of work, light conditions (day or night work) and potential structural problems such as physical obstacles that may limit or block the view.

In certain cases, there may be a need to be able to use a demolition robot in environments, where an operator cannot stay for various reasons, and the demolition robot can be located outside an operator's visual range. For instance, this can be the case of work with the demolition robot in a mining site with a high risk of collapse within the surroundings of the demolition robot, or work in a radioactive environment, where an operator staying in the work area of the demolition robot risks being exposed to and unacceptably high dose of radioactive radiation.

SUMMARY OF THE INVENTION

An object of the present invention is therefore to achieve a demolition robot with improved field of application than prior art demolition robots and thereby a demolition robot that is more useful than demolition robots known so far and not least in the situations outlined above. This object of the invention is resolved by the demolition robot having the features and characteristics stated in claim 1. Another object of the invention relates to a method to achieve a demolition robot with improved field of application. This object of the invention is resolved by a method having the features and characteristics according to some embodiments of the present disclosure.

In an embodiment, the demolition robot comprises a transmission device and an image reproduction means, with which surroundings of the demolition robot can be presented to an operator, who by a line thereof can control and operate the demolition robot by indirect viewing and which transmission device comprises, an image sensor device, which can register first image data and second image data of a scene of surroundings from at least two view directions, wherein the image sensor device is arranged so that at least part of the working tool is visible in said scene of the registered image data, a unit for communication with the image reproduction means, which is arranged to show the image area to the operator in real time.

In an alternative embodiment, the transmission device is located on board the demolition robot, while the image reproduction means is located outside the demolition robot.

In another embodiment, the demolition robot's transmission device comprises a unit for wireless short-range data communication as for instance Wi-Fi, Bluetooth or Zigbee, preferably with encryption.

In an alternative embodiment, the image sensor device for registration of first and second image data comprises 3D image sensor units or image sensor units, which are susceptible to IR radiation.

BRIEF DESCRIPTION OF THE DRAWINGS

In the following, an exemplary embodiment of the invention is described in further detail with reference to the accompanying drawing, in which.

DETAILED DESCRIPTION OF THE PREFERRED EMBODIMENTS

Figure 1:
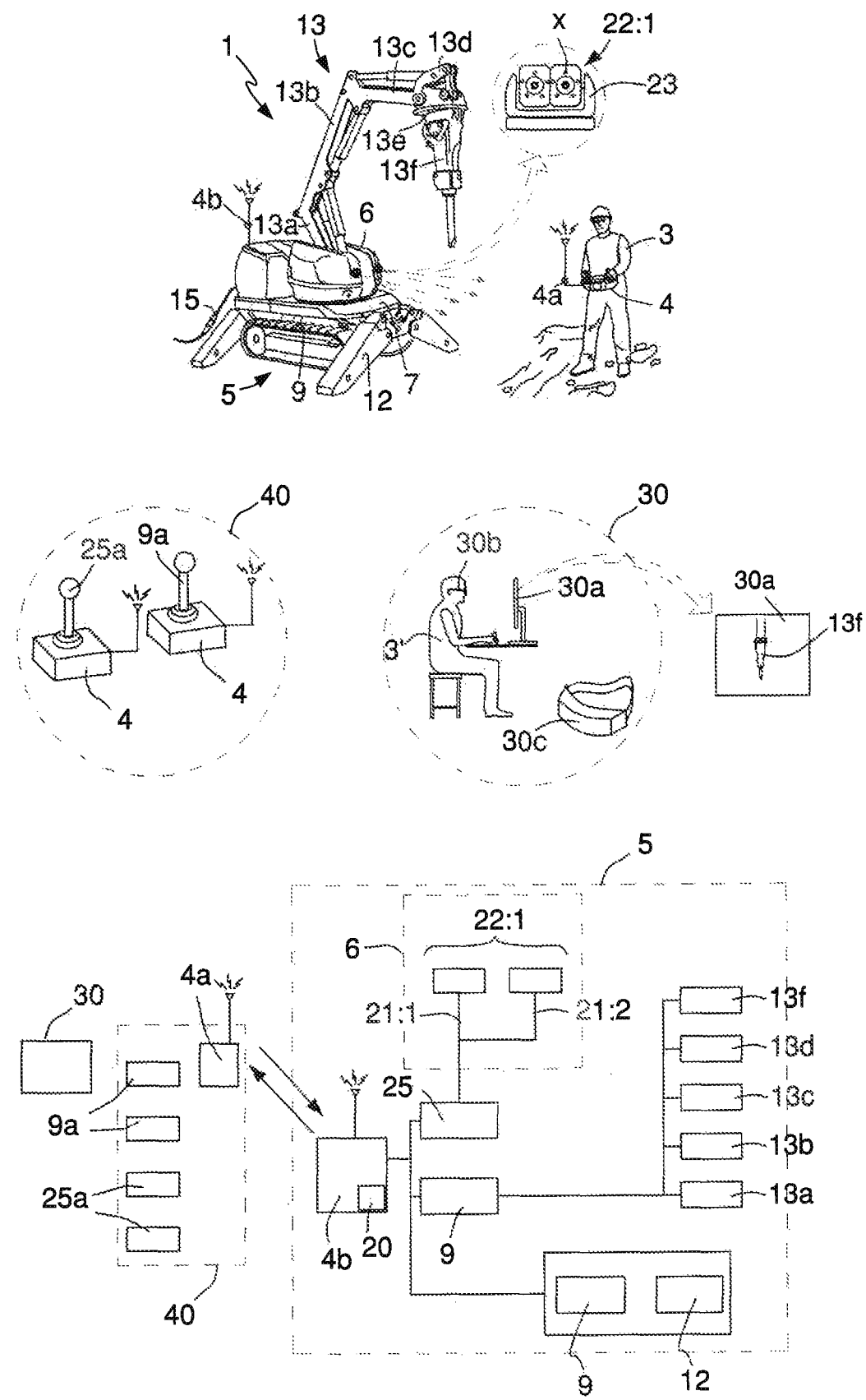
FIG. 1 schematically shows a block diagram of a control and operating system in an embodiment for transmission of image data for 3-dimensional reproduction of scenes and objects between a transmitter and a receiver, and which can be included in an demolition robot with improved field of application according to the present invention.

FIG. 1 shows a generally denoted 1 mobile electrically powered wrecking and demolition robot, in the following called demolition robot 1. The demolition robot 1 is normally intended to be controlled and operated by an operator 3, who walks beside the demolition robot and remote-controls it via a radio link (mobile network) by means of a remote-control device, comprising a transmitter unit 4a, which is normally located outside the demolition robot 1. The remote-control device also includes a receiver unit 4b, which is normally located on board the demolition robot 1. The operator 3 can thus, during broadcasting of control signals, constantly be at an adequate safety distance from the working area of the demolition robot. The operator 3 can move freely around the demolition robot and constantly seek suitable areas that give the operator a good overview of the work of the demolition robot.

Figure 3:
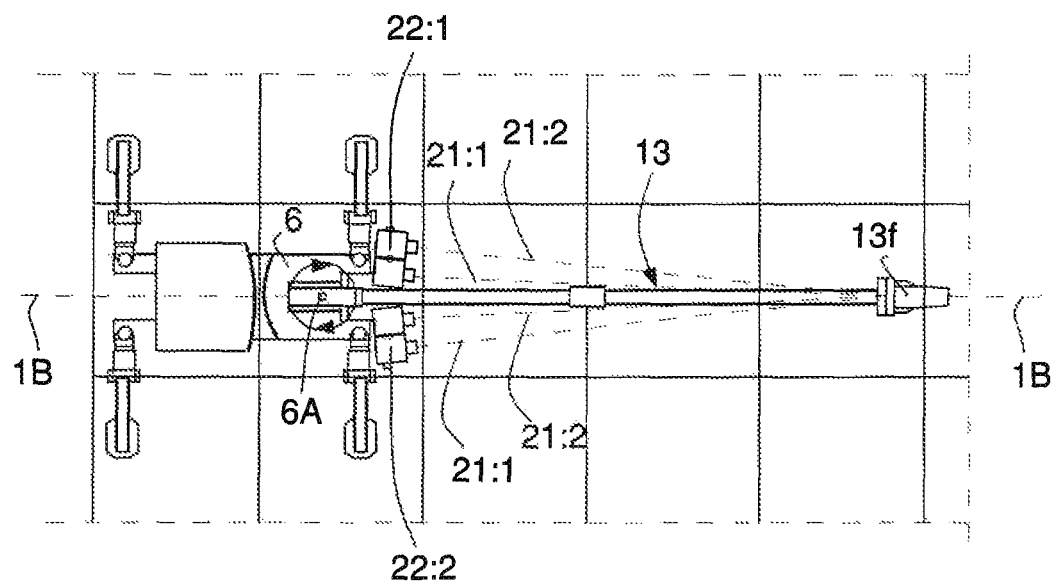
FIG. 3 shows a plane view of optical axes and the field of vision for a scene to the right and the left, respectively, when receiving image data from a first respectively a second image sensor located on either side of a vertical plane about which an arm means constituent in the demolition robot is moveable, FIG. 4 schematically shows a block diagram of a control and operating system in an alternative embodiment and transmission of image data for 3-dimensional reproduction of scenes and objects between a transmitter and a receiver, and which can be included in an demolition robot with improved field of application according to the present invention.

The demolition robot 1 generally comprises a chassis with a carriage 5 with a top 6 and a base 7. The demolition robot 1 has a rotation device, with which the top 6 is twistably bedded on the base 7 for swinging in a horizontal plane about a vertical axis 6A, which is shown in FIG. 3. On the carriage 5, a robot control unit 9 is sustained with which the receiver unit 4b of the remote-control device is connected. Through the impact of the remote-control device's transmitter unit 4a, the operator 3 can give the demolition robot commands that can be registered by the robot control unit 9 and which cause the robot control unit to control the operation of the remote-controlled demolition robot 1.

The carriage base 7 is provided with a propulsion device comprising right respectively left tracks 9. Support legs are denoted 12 and are operated by associated hydraulic cylinders, and an operable arm means is denoted 13, is sustained on the top 6 and is operable in a vertical plane 1B by means of hydraulic cylinders, see also FIG. 3. The arm means 13 includes a boom 13a, an operating arm 13b and a operating link 13c located farthest out on the arm means.

A cable is denoted 15 and is intended to be connected to a stationary electric network to provide the demolition robot 1 with electric power.

The arm means 13 is at its free end provided with a tool attachment 13e, in which various types of working tools 13f can be removably arranged and optionally also be connected for hydraulic operation. The working tool 13f can be activated for operation by means of the remote-control device 4.

Everything described above is essentially already known.

According to the invention, it is desired to improve the field of application of the demolition robot. Substantially by enabling an operator to control and operate the work of the demolition robot without the operator having to be in the surroundings of the demolition robot. With the invention, surroundings of the demolition robot 1 can be presented to an indirectly viewing operator in such a manner that the operator in practice can perform desired work tasks. In the following an indirectly viewing operator is denoted 3' to be distinguished from a normally operating directly viewing operator 3.

There can be a number of various needs for indirect viewing and the possibility of operating without the demolition robot and/or its surroundings being directly visible, for instance for work in health-harmful or particularly dangerous environments.

According to the invention, the demolition robot 1 also comprises a broadcasting device 20 for image transmission and an image reproduction means 30, with which surroundings of the demolition robot can be presented to the indirectly viewing operator 3', who by a line thereof can control and operate the demolition robot, The broadcasting device 20 can suitably be located on board the demolition robot 1 and be integrated in said receiver portion 4b, which implies that, unlike a known demolition robot, communication between the transmitter/receiver will in part be bi-directional as illustrated with double arrows in the block diagram in FIG. 1.

The remote-control device's transmitter unit 4a located outside the demolition robot sends out control signals and commands to the receiver unit 4b on board the demolition robot 1, while the broadcasting device 20 transfers images to the image reproduction means 30 outside the demolition robot. The broadcasting device 20 is preferably in wireless connection with the image reproduction means 30. The image reproduction means 30 is located outside the demolition robot 1 and can, but should not necessarily, be hand-held.

The demolition robot 1 furthermore includes an image sensor 22:1, which comprises a first lens, which can register first image data 21:1 and a second lens, which can register second image data 21:2 of a scene of the surroundings. Each lens can thus register a specific scene from two different view directions in the manner illustrated in FIG. 3.

The image sensor 22:1 is hereby so arranged on board the demolition robot's 1 rotatable top 6 that at least part of the working tool 13f is stereoscopically visible in said scene of registered image data. The image sensor device 22:1 can be connected with a central unit (CPU), which comprises software, in which said first and second image data 21:1, 21:2 can be superposed to generate a stereoscopic image area, which corresponds to said scene.

As said image data 21:1, 21:2 comprises a scene with different camera perspectives, the operator 3' can perceive the scene as spatial and with depth as the scene is viewed with both eyes. For the sake of clarity, it can be mentioned that the left respectively right eye will hereby see different images, which the viewer will perceive. Glasses 30b, which can filter out either colours red/green or polarization of the light (horizontal/vertical) in corresponding images for the left respectively the right eye can be included in the demolition robot and be used for the operator 3' to experience stereoscopic vision or so-called 3D effect.

In a first embodiment, the demolition robot 1 can be equipped with a single image sensor 22:1, which can suitably be placed at a front end of the demolition robot's 1 rotatable top 6 and having a pair of lenses, which are directed forward in the longitudinal direction of the arm means 13. Such a first image sensor 22:1 can thus be placed on the one side of the vertical plane 1B, in which the arm means 13 is moveable.

In a second embodiment, the demolition robot 1 can be equipped with two separate image sensors 22:1, 22:2, placed at a front end of the demolition robot's 1 rotatable top 6 and directed forward in the longitudinal direction of the arm means 13. More specifically, a first image sensor 22:1 respectively a second image sensor 22:2 can hereby be placed on either side of the vertical plane 1B, in which the arm means 13 is moveable, whereby each image sensor is directed towards the working tool 13f, which is attached to the end of the arm means 13.

As most clearly appears from FIG. 3, the demolition robot 1, at a front end of the rotatable top 6, is equipped with a first image sensor 22:1 on the right side (R) and a second image sensor 22:2 on the left side (L) of the vertical plane 1B in which the arm means 13 is moveable. As the image sensors 21:1, 21:2 are placed on either side of the said vertical plane 1B, and indirectly viewing operator 3' can obtain image data 20:1, 20:2 in real time, a scene from each side of the arm means 13 of the demolition robot 1.

Figure 2:
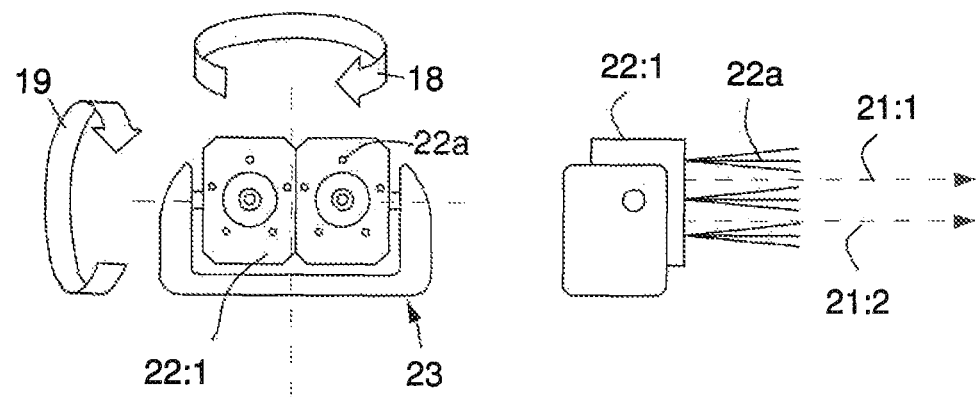
FIG. 2 shows a view from the front of a carrier for an image sensor device, which offers indirect viewing and which is included in a demolition robot according to the present invention.

As shown in FIG. 2, each image sensor 22:1, 22:2 can be equipped with built-in light sources 22a, for instance of the LED type.

FIG. 2 also illustrates in more detail how each image sensor 22:1, 22:2 can be placed on a so-called gimbal 23 and through the operation of which each image sensor is twistable in a horizontal plane about a first axis 18 as well as twistable in a vertical plane about a second axis 19. Each of said degrees of freedom for setting and control of the image sensors 21:1, 21:2 can be performed by an indirectly viewing operator 3' via the remote control's 40 transmitter/receiver units 4a, 4b.

Figure 4:
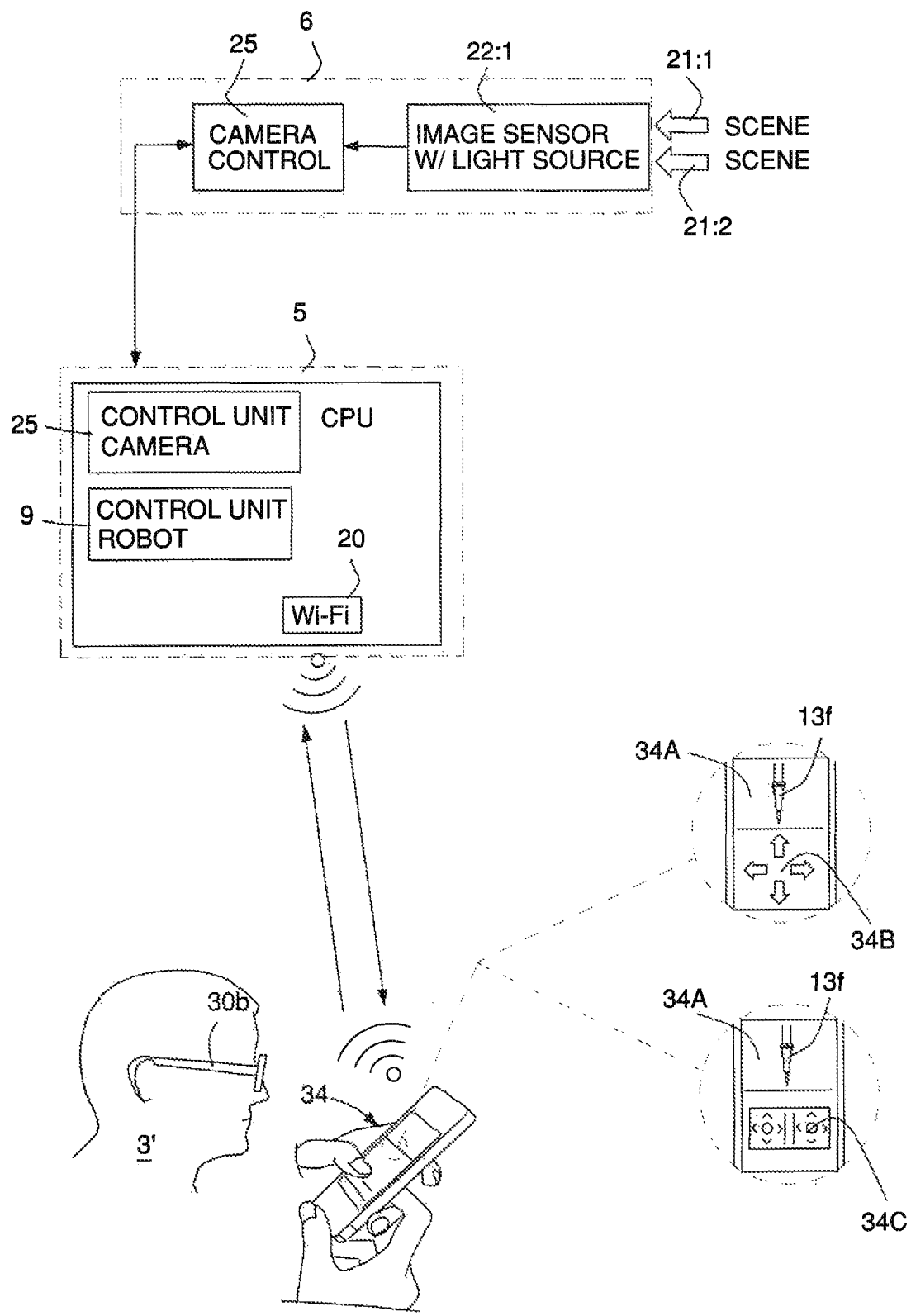

Alternatively, as shown in FIG. 4 via a smartphone 34, which will be described in more detail below. It should be understood that a smartphone equipped with suitable application programs and touchscreen (pekskarm in Swedish) can be used for camera control.

FIG. 3 illustrates in a plane view of optical axes and the field of vision for a scene to the right respectively a scene to the left of the arm means 13 of the demolition robot 1. Hereby the first image sensor 22:1 receives first respectively second image data 21:1 21:2 from a scene to the left of the arm means 13. Correspondingly, the second image sensor 22:2 receives first respectively second image data 21:2, 21:2 from a scene to the left of an arm means 13. Received image data can via data processing generate an image area, which in the form of a spatial three-dimensional scene that can be viewed by the indirectly viewing operator 3' and in which image area at least part of the working tool 13Bf is visible.

3D is short for three-dimensional and is the space perspective, in which length, width and depth can be registered. A 3D camera relates to an image sensor, wherein each such sensor unit comprises at least two camera modules (lenses) in mutually displaced perspective in order to take two-dimensional images. Unlike a conventional camera, a 3D camera also takes depth information and thereby generates three-dimensional image data with distance or distance values for the individual pixels in the 3D image. 3DTV is technology for television, which can transfer a three-dimensional moveable image. A number of various presentation devices for an operator in case of indirect viewing are known, for instance 3DTV technology and stereoscopic virtual retina display (VRD), retinal projectors (nathinneprojektor in Swedish) not shown, or VR headsets 30c.

FIG. 3 shows a first respectively second image sensor 22:1, 22:2 placed so that each image sensor, for accumulation of first and second image data 21:1, 21:2, has a view direction or line of sight, which is directed along the arm means 13 at any angle towards this with an imaginable common target position towards a free end of the working tool 13f attached to the arm means' 13 tool attachment 13e. In real time, indirect viewing is created in a virtual environment. The operator 3' can be in an optional physical place, which is different from the image sensors 22:1, 22:2, but experience it as if the person is virtually in the same place as said image sensors.

For the indirectly viewing operator 3' to have a good perception of the surroundings, they should be presented to the operator in the form of a 3D image in as large a field of vision as possible, for instance by means of one or a plurality of large display screens 30a. As regards stereo-photographic 3DTV two images are thus shown, one for each eye. Thus, red-green 3D glasses 30b can be used together with a usual 2DTV screen. The glasses 30b show a red image for one eye and a green image for the other eye. Practical experiments with a demolition robot 1 have shown that stereo-photographic 3DTV that shows two images, one for each eye, in combination with red-green 3D glasses and an ordinary 2DTV screen function very well and without it becoming significantly tiresome for an indirectly viewing operator 3'.

It is essential that an indirectly viewing operator 3' can search the surroundings, not just straight ahead but also to the sides of the demolition robot 1. For this purpose, each image sensor 22:1, 22:2 can be of the type that offers advanced image sensor control, for instance of the so-called pan/tilt type with zoom-in function. This type of camera can thus partly be placed on said gimbal 23, partly, through said pant/tilt features, be capable of zooming in and thus for instance follow an object that moves.

Again, with reference to FIG. 1, the block diagram shows in more detail a basic drawing of an embodiment of the invention, which gives a demolition robot improved field of application.

As stated above, the demolition robot 1 comprises an image reproduction means 30 for reproduction of a 3D image for the indirectly viewing operator 3' of a scene with image data 21:1, 21:2 captured by the image sensor 22:1. A remote-control device 40 with a transmitter unit 4a and a receiver unit 4b of the kind described above comprises levers and regulation 9a, which can be impacted by an indirectly viewing operator 3' and give the command, which can be registered by the demolition robot's 1 control unit 9 to control the operation of the remote-controlled demolition robot.

In an alternative embodiment, the demolition robot 1 comprises a camera control unit 25. The remote-control device 40 thus comprises levers and regulation 25a for control of each image sensor 22:1 included in the demolition robot 1. The control can relate to advanced image sensor control, for instance of the so-called pan/tilt type with zoom-in function as described above. The remote-control device's 40 transmitter unit 4a located outside the demolition robot, thus sends out control signals commands to the receiver unit 4b on board the demolition robot 1, which in turn leaves said control signals and commands to the robot control unit 9 and/or the image sensor control unit 25. At the same time, the broadcasting device 20 located on board can transfer images to the image reproduction means 30 located outside the demolition robot, which in real time can be seen by the indirectly viewing operator 3'. The broadcasting device 20 is preferably in wireless connection with the image reproduction means 30.

FIG. 4 schematically shows a block diagram of a control and operating system in an alternative embodiment, wherein at least one of the remove-control device 40 or the broadcasting device 20 and the image reproduction means 30 comprises technology that offers bi-directional wireless short-range communication. Wireless short-range communication means cheap short-range technology such as WPAN technology (Wireless Personal Area Network), Wi-Fi or Bluetooth, which usually does not depend on a third-party operator.

Hereby, at least the image reproduction means 30 could be constituted by a hand-held unit, a so-called smartphone 34 or tablet, which can communicate bi-directionally with short-range communication. Correspondingly, the broadcasting device 20 located on board is a unit which can communicate bi-directionally with the short-range communication.

A smartphone 34 can be equipped with suitable software that is constituted by a so-called application or so-called app, which enables an indirectly viewing operator 3', via said image sensors 20:1, 20:2, to obtain image information in real time about the surroundings of the demolition robot 1 as well as give commands that can be registered by a control unit 9 included in the demolition robot 1 to control the operation of the remote-controlled demolition robot.

The system hereby utilizes the wireless communication units, which are already installed in a smart mobile phone or tablet. In the following, the expressions smartphone, mobile phone or tablet relate to hand-held computers, "smart mobile phones", slate computers and information screens and similar appliances with touch screens that can function for input of data and/or commands, so-called in units.

The smartphone 34 can thus comprise a suitable first user interface area 34A, which in real time shows a 3D image based on image data from a first image sensor 22:1. By a suitably configured second user interface area 34B of the smartphone 34A, the indirectly viewing operator 3' can give commands that can be registered by the demolition robot's remote-control unit 9 to control the operation of the remote-controlled demolition robot. In the latter case, a central processing unit CPU constituent in the demolition robot 1 can be connected to a primary Wi-Fi unit, which can exchange both input and output with the secondary Wi-Fi unit included in said smartphone 44.

In an alternative embodiment, it is worth considering that the image reproduction means 30 comprises software arranged for the operator 3' to graphically present a third user interface zone 34C with which the operator can give commands that can be registered by a camera control unit 25 and which makes it control and operate the image sensor device's 22:1 view direction and/or panning and/or zoom.

In another embodiment, the software can be configured so that it enables the operator 3' to operationally at the same time show and use two in combination of each of the first, second or third user interface zones 34A, 34B, 34C mentioned above.

The demolition robot 1 can thus be controlled by means of a smartphone 34 via suitable software, i.e. an application program and a touch or click surface 34B in another user interface area 34B on said smartphone 34. By means of red-green 3D glasses 33, the indirectly viewing operator 3' can look at the images in the smartphone 34, wherein said glasses can convert the 2D images on the smartphone's 34 screen 34A phone 3 into a 3D image.

It is worth considering that the communication between the broadcasting device 20 and the image reproduction means 30 can comprise a fixed or stationary environment, for instance a wired network or cable, but it should be understood that the wireless environment described above in comparison has completely different pre-conditions than a stationary environment.

What is claimed is:

1. A remote-controlled demolition robot, comprising:
   a chassis with a travelling base and a rotatable top in a horizontal plane,
   a moveable arm in a vertical plane, which is suspended on the top,
   a working tool suspended in the arm organ,
   a controller,
   a remote-control intended to be impacted by an operator of the demolition robot and arranged to give commands that are registered by the controller and which cause the controller to control the operation of the remote-controlled demolition robot,
   a broadcaster and an image display, and
   a first image sensor and a second image sensor respectively placed in each sides of the vertical plane in which the arm is moveable,
   wherein each image sensor is directed towards the working tool, which is attached at the end of the arm, the first image sensor is placed on one side of the vertical plane, in which the arm is moveable,
   wherein the first image sensor registers first three-dimensional image data and second three-dimensional image data of a scene of surroundings of the demolition robot from at least two different view directions, and correspondingly, the second image sensor registers the first three-dimensional image data and the second three-dimensional image data respectively of the scene on the other side of the vertical plane,
   the broadcasting device communicates with the image display, and
   the image display is arranged to show an image area of a spatial three-dimensional scene of said scene in real time for an operator, who with a line thereto controls and operates the demolition robot through indirect viewing, and
   the first image sensor and the second image sensor are arranged to the demolition robot so that at least part of the working tool is visible in said image area,
   wherein the remote-controlled demolition robot further comprises a central processor comprising software that superposes the first three-dimensional image data and the second three-dimensional image data for generating an image area corresponding to said scene.

2. The remote-controlled demolition robot according to claim 1, wherein the broadcaster is located on board the demolition robot, while the image display is located outside the demolition robot.

3. The remote-controlled demolition robo according to claim 1, wherein the broadcaster comprises is adapted for wireless communication with the image display.

4. The remote-controlled demolition robot according to claim 3, wherein the broadcaster's wireless communication comprises wireless short-range data communication.

5. The remote-controlled demolition robot according to claim 1, wherein the image sensors for registration of said first and second image data comprise a 3D image sensor or an image sensor that is susceptible to IR radiation.

6. The remote-controlled demolition robot according to claim 1, wherein the image display comprises one or a plurality of display screens, VR headsets, a hand-held computing device, a so-called smartphone.

7. The remote-controlled demolition robot according to claim 1, comprising a camera controller with which the image sensors' view of the scene for reception of said first image data and second image data is varied through adaptation of at least one of the following parameters; view direction, panning, zoom.

8. The remote-controlled demolition robot according to claim 7, wherein the remote-control comprises a transmitter and a receiver, levers and regulation, which are impacted by the indirectly viewing operator and give commands, which are registered by the demolition robot's camera controller and allow advanced image sensor control by one of the following controls: direction guide, panning/tilt, zoom.

9. The remote-controlled demolition robot according to claim 7, wherein the image display comprises software arranged for the operator to graphically present a third user interface zone with which the operator can give the commands that are registered by the camera controller and which makes it control and operate the image sensor devices' view direction.

10. The remote-controlled demolition robot according to claim 1, wherein the remote-control comprises a transmitter and a receiver, levers and regulation, which are impacted by the indirectly viewing operator and give commands, which are registered by the demolition robot's controller to control the operation of the remote-controlled demolition robot.

11. The remote-controlled demolition robot according to claim 1, wherein the image display comprises software arranged for the operator to graphically present a first user interface zone, in which the image area corresponding to said scenes is shown.

12. The remote-controlled demolition robot according to claim 1, wherein the image display comprises software arranged for the operator to graphically present a second user interface zone, in which a touch surface is included with which the operator can give commands that are registered by the controller, and which cause the controller to control the operation of the remote-controlled demolition robot.

13. The remote-controlled demolition robot according to claim 1, wherein the image sensors are located at a front end of the demolition robot's rotatable top and have a pair of lenses that are directed in the arm's longitudinal direction forward.

14. The remote-controlled demolition robot according to claim 1, wherein the image display comprises red-green 3D glasses, which are used by the operator.

15. A method to achieve a demolition robot according to claim 1, wherein the following operational steps are performed;
   connecting the demolition robot to the remote-control, the transmitter and receiver of which enable bi-directional communication,
   selecting the bi-directional communication such that the image data is transmitted wirelessly from surroundings of the demolition robot to the image display located outside the demolition robot, by which the operator can control and operate the demolition robot through indirect viewing.

* * * * *